(12) United States Patent
Jhingan

(10) Patent No.: US 7,457,819 B2
(45) Date of Patent: Nov. 25, 2008

(54) CONFIGURABLE FLAT FILE DATA MAPPING TO A DATABASE

(75) Inventor: Nitin Jhingan, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/688,574

(22) Filed: Oct. 17, 2003

(65) Prior Publication Data

US 2005/0086235 A1 Apr. 21, 2005

(51) Int. Cl.
*G06F 7/00* (2006.01)
*G06F 17/00* (2006.01)

(52) U.S. Cl. .................................. 707/103 R; 707/101

(58) Field of Classification Search ............. 707/1, 707/102, 201; 709/223, 246; 705/40
See application file for complete search history.

(56) References Cited

U.S. PATENT DOCUMENTS

| | | | |
|---|---|---|---|
| 6,505,172 B1 | 1/2003 | Johnson et al. | 705/27 |
| 6,704,743 B1 * | 3/2004 | Martin | 707/103 R |
| 6,820,135 B1 * | 11/2004 | Dingman et al. | 709/246 |
| 6,999,956 B2 * | 2/2006 | Mullins | 707/2 |
| 2002/0111922 A1 * | 8/2002 | Young et al. | 705/80 |
| 2004/0078328 A1 * | 4/2004 | Talbert et al. | 705/40 |
| 2004/0181753 A1 * | 9/2004 | Michaelides | 715/523 |

* cited by examiner

*Primary Examiner*—Apu Mofiz
*Assistant Examiner*—Susan Chen
(74) *Attorney, Agent, or Firm*—Scully, Scott, Murphy & Presser, P.C.; William E. Schiesser, Esq.

(57) ABSTRACT

Disclosed are a method and framework for mapping data from a data source to a data destination. The method comprises the step of providing a plurality of components for performing defined functions to map the data from the source to the destination. These plurality of components perform the steps of (i) reading data from the source, (ii) processing the read data according to a set of rules, and (iii) loading the processed data into the destination. Preferably the plurality of components perform the further steps of (iv) verifying the integrity of the read data, and (v) logging results into a file. Each of the components operates independently of the other of the components.

12 Claims, 3 Drawing Sheets

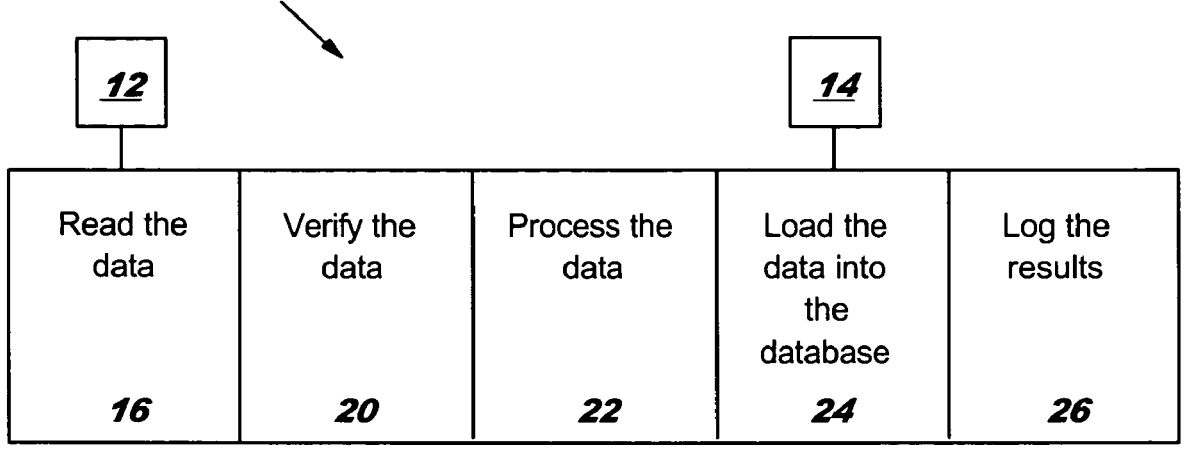
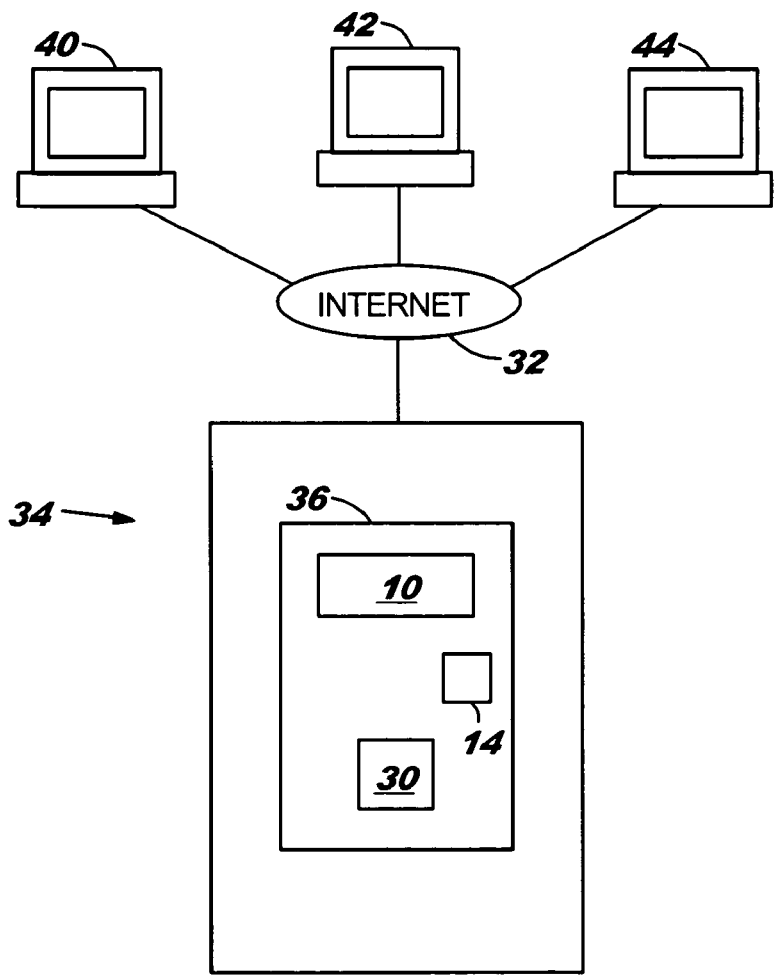

FIG. 3

HEADER <name> <date>
CURR1USD
CURR2USD INR 46
TRAILER 000002 <timestamp>

FIG. 4

```
/**
 * Insert the type's description here.
 * Creation date: (01/03/01 10:40:38 PM)
 * @author: Nitin Jhingan
 */
public interface Formatter {
/**
 * Insert the method's description here.
 * Creation date: (01/03/01 10:41:06 PM)
 * @return java.lang.String
 * @param param java.lang.String
 */
String format(String param);
}
```

FIG. 5

```
import java.util.*;
/**
 * Insert the type's description here.
 * Creation date: (11/02/00 10:54:38 PM)
 * @author: Nitin Jhingan
 */
public interface Implementer {
/**
 * Insert the method's description here.
 * Creation date: (11/02/00 10:55:38 PM)
 * @return int
 * @param param java.util.Hashtable
 */
String int process(Hashtable param);
}
```

FIG. 6

```java
import java.util.*;
/**
 * Insert the type's description here.
 * Creation date: (2/27/2002 3:30:31 PM)
 * @author: Nitin Jhingan
 */
public interface Logger {
/**
 * Insert the method's description here.
 * Creation date: (3/4/2002 2:58:19 PM)
 * @param identifier java.lang.String
 * @param value int
 */
void addProcessingCount(String identifier, long value);
/**
 * Insert the method's description here.
 * Creation date: (3/4/2002 2:43:12 PM)
 * @param identifier java.lang.String
 * @param value java.lang.String
 */
void addText(String identifier, String strRecord, Hashtable value);
/**
 * Insert the method's description here.
 * Creation date: (3/4/2002 1:23:14 PM)
 */
void cleanUp();
/**
 * Insert the method's description here.
 * Creation date: (3/4/2002 1:22:43 PM)
 * @param param java.util.Hashtable
 */
void initialize(java.util.Hashtable param);
/**
 * Insert the method's description here.
 * Creation date: (3/4/2002 1:23:28 PM)
 /*
void sendMail();
}
```

CONFIGURABLE FLAT FILE DATA MAPPING TO A DATABASE

BACKGROUND OF THE INVENTION

1. Field of the Invention

This invention generally relates to data mapping, and more specifically, the invention relates to mapping data from an input file to a database.

2. Background Art

Computer applications are being used more and more. Today, particularly with the widespread availability of the Internet, businesses are able to make an ever increasing number of applications available worldwide twenty-four hours a day, seven days a week for use by customers, employees and suppliers. This presents important opportunities and challenges for businesses.

One challenge is to design the applications so that they can be used by different users who may access or input data to the applications using different data formats or files. Another challenge is to design the applications so that, in case users change the data formats used to input data to the applications, or it otherwise becomes advantageous to change the way data is input to the applications, the applications can be readily modified to accommodate new or different data formats and files.

SUMMARY OF THE INVENTION

An object of this invention is to improve methods and systems for mapping data from a source to a database.

Another object of the invention is to provide an extensible framework having a group of components, which can be readily modified or replaced, for handling various functions as data is mapped from a source to a database.

A further object of the present invention is to provide a framework, comprised of a group of independently adjustable components, to process data from one source, validate the data, apply business rules on the data, load the data into a database, log the results of this whole procedure, and send mailings to configured parties.

These and other objectives are attained with a method and framework for Mapping data from a data source to a data destination. The method comprises the step of providing a plurality of components for performing defined functions to map the data from the source to the destination. These plurality of components perform the steps of (i) reading data from the source, (ii) processing the read data according to a set of rules, and (iii) loading the processed data into the destination. Preferably the plurality of components perform the further steps of (iv) verifying the integrity of the read data, and (v) logging results into a file. Each of the components operates independently of the other of the components. The invention can be embodied in a program storage device readable by a computer, tangibly embodying a program of instructions executable by the computer to perform method steps for mapping data from a data source to a data destination.

The preferred embodiment of the invention, described in detail below, provides a framework written in the java programming language to read a file and to verify the file data by, for example, checking for counts and/or data consistencies. The framework then processes the data, which may involve applying various business logic classes as applicable, and then loads the data into a database. The framework also logs the results into a file, which can then be emailed.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 1 schematically illustrates a processing framework in accordance with this invention.

FIG. 2 shows a computer network system with which the present invention may be used.

FIG. 3 is an example of a file that may be read by the framework of FIG. 1.

FIG. 4 shows an example of a formatter interface code that may be used by the framework.

FIG. 5 provides an example of an implementer interface code that may be implemented by the framework.

FIG. 6 shows the code for a logger feature that may be used by the framework.

DETAILED DESCRIPTION OF THE PREFERRED EMBODIMENTS

With reference to FIG. 1, the preferred embodiment of the invention provides a framework, generally referenced at 10, for mapping data from a source, represented at 12, to a database, represented at 14; and this framework comprises a plurality of components 16, 20, 22, 24 and 26 for performing various functions. Component 16 is provided to read a file, and component 20 is used to verify the file data by, for example, checking for counts and/or data consistencies. Component 22 is used to process the data, which may involve applying various business logic classes as applicable, component 24 is utilized for loading the data into a database 14, and component 26 is provided to log the results into a file, which can then be emailed.

Component 16 may utilize any suitable procedure and is provided with suitable means to read data from a file. For example, component 16 may be designed to read flat, or xml, files. Also, any suitable procedure may be employed by component 20 to verify the integrity of the read data. Numerous such procedures are known in the art and can be used in the practice of this invention.

Component 22 may apply a wide range of business rules to the data read by framework. Preferably, these rules can be created, modified or deleted by an authorized administrator. In addition, any appropriate procedure may be used by component 24 for loading the data into a database. Many specific procedures are known by those of ordinary skill in the art and can be used in component 24.

It should be noted that while the specific framework 10 represented in FIG. 1 only reads files, the framework can be extended to other sources of data like databases, mq series queues, etc. Also, while this specific embodiment of framework 10 only loads data into a database, the framework can be extended to other sources as well.

Preferably, each of the components 16, 20, 22, 24 and 26 operates independently of the other components of the framework 10. In this way, each component can be modified or replaced without affecting the operation of the other components. Also, preferably the individual programs of the components 16, 20, 22, 24 and 26 can be updated or modified by authorized administrators during the use of framework 10.

Framework 10 of this invention can be used in many specific situations. For example, the framework may be used in conjunction with, and be specifically designed to assist, some other application, which uses the data from database 16. In addition, framework 10 may be used on or with a computer network, such as a LAN, a WAN or the Internet.

FIG. 2 shows, for example, framework 10 used in conjunction with another application 30 available via the Internet 32 at a Web site 34. More particularly, FIG. 2 shows a server 36 and a plurality of clients 40, 42, 44. Server 36 and clients 40, 42, 44 are connected to the Internet 32, and the server is provided with application 30, which can be accessed by clients 40, 42, 44 via the Internet. Server 36 is also provided with framework 10, which runs on the server to map input data from the clients to database 14, from where the data can be accessed by application 30.

FIGS. 3-6 show, as more particular examples, specific file or code that can be used with or on framework 10. In particular, FIG. 3 shows an example of a file rcvd for currencies that may be read be framework 10. As mentioned above, it should be noted that while the specific framework 10 represented in FIGS. 1 and 2 only reads files, the framework can be extended to other sources of data like databases, mq series queues, etc.

More specifically, framework 10 maps fixed length fields in the input file to a java object type field. This framework reads the xml file. For a particular field, the framework determines the start position, the length, what database column the field maps to, which database tables the field maps to, whether the field can be updated or not, and what kind of formatter to be applied on this field. The framework calls the java class as defined within the <formatter></formatter> tags. This java class implements the formatter interface, defined as:—package com.ibm.kestrel bridges. FIG. 4 shows an example of a formatter interface code.

The interface of FIG. 4 defines one method: String format (String param). This method may be overridden by the implementations of this formatter class. This is useful, for example, for formatting data fields. For example, a source system may send a date in the format of yyyymmdd, but the database table may accept only a timestamp. By utilizing a formatter, the present invention eliminates the need for writing code for formatting a date within the business logic classes.

Another file may be used to define an event handler. The event handler preferably implements the Implementer interface:—package com.ibm.kestral bridges. FIG. 5 shows an example of an Implementer interface code.

The Implementer Interface of FIG. 5 refers to a Hashtable. This Hashtable object contains a map of pofield objects and other classes, like the DBActions class that is used to manage database activity.

The framework 10 also preferably manages transactions. A transaction is started when the first record is read, and the transaction is committed or rolled back when the record, as defined in a record parameter, is encountered. This helps to insulate programs with which framework 10 is used from managing a transaction.

Preferably, framework 10 includes a Logger feature that can be used by implementing the Logger interface:—package com.ibm.kestrel bridges. FIG. 6 shows, as an example, the code for a Logger feature.

Using this logger feature, an application can add various notifications, and then finally send e-mail to a configured list of email ids. The Logger feature of FIG. 6 supports sending mail using "TO, CC and the BCC features of the mail.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for mapping data from a data source to a data destination, comprising the steps:

providing a plurality of separate components, operating in series between the data source and the data destination, for performing defined functions to map the data from the source to the destination, including the steps of:

i) a first of the components reading data from the source, ii) a second of the components receiving the data from the first of the components and processing the read data according to a set of rules, said second component including a formatter converting selected dates from a first format to a second format , thereby eliminating the need for writing code for formatting the selected dates, and iii) a third of the components receiving the data from the second of the components and loading the processed data into the data destination;

a system administrator updating the components during use of the components;

wherein the first of the components operates in series between the data source and the second of the components, and the third of the components operates in series between the second of the components and the data destination;

wherein each of the components operates independently of the other of the components and each of the components can be modified, adjusted and replaced independently of the others of the components to facilitate mapping data from a plurality of different data sources, having data in different formats, into the data destination;

wherein the plurality of components perform the further functions of (iv) verifying the integrity of the read data, and (v) logging results into a file, and a respective one of the components performs each of the functions (i)-(v);

wherein the data destination is a database, and said step of providing a plurality of separate components includes the further step of using said plurality of components:

mapping fixed length fields in the data source to a Java object type in a pofield in the database;

determining the start position, the length, what database column the fields map to, which database tables the fields map to, whether the fields can be updated or not, what kinds of formatting to be applied on the fields by referring to Hash Table Objects which contain the mapping of pofield objects in a DBA action class that is used to manage database activity;

calling a formatter to reformat data from the data source; and managing transactions by starting a transaction when a first record is read, and committing the transaction when a defined record, as defined in a record parameter, is encountered; and wherein the second component verifies the integrity of the read data by checking for counts and data consistencies; and wherein said plurality of components include a first file for reading currencies, a second file for formatting data fields, and a third file to define an event handler.

2. A method according to claim 1, wherein the data source is a flat file.

3. A method according to claim 1, wherein the plurality of components perform the further step of sending the results, by electronic mail, to a configured list of email addresses.

4. A method according to claim 1, wherein the step of processing the read data includes the step of formatting the read data for placement in the data destination.

5. A computer system for mapping data from source to a data destination, comprising;
   a computer sever;
   a plurality of separate components running on the sever, said components operating in series between the data source and the data destination, for performing defined functions to map the data from the source to the destination, said plurality of components including (i) a first components reading data from the data source, (ii) a second component receiving the data from the first component and processing the read data according to a set of rules, said second component including a formatter converting selected dates from first format to a second format, thereby eliminating the need for writing code for formatting the selected dates, and (iii) a third component receiving the data from the first component and for loading the processed data into the data destination;
   wherein the first of the components operates in series between the data source and the second of the components, and the third of the components operates in series between the second of the components and the data destination;
   wherein each of the components operates independently of the other of the components and each of the components can be modified, adjusted and replaced independently of the others of the components to facilitate mapping data from a plurality of different data sources, having data in formats, into the data destination;
   wherein the plurality of components perform the further functions of (iv) verifying the integrity of the read data, and (v) logging results into a file, and a respective one of the components performs each of the functions (i)-(v);
   wherein the data destination is a database, and said plurality of separate components perform the further functions of:
   mapping fixed length fields in the data source to a java object type in a pofield in the database;
   determining the start position, the length, what database column the fields map to, which database tables the fields map to, whether the fields can be updated or not, what kinds of formatting to be applied on the fields by referring to Hash Table objects which contain the mapping of pofield objects in a DBA action class that is used to manage database activity;
   calling a formatter to reformat data from the data source; and
   managing transactions by starting a transaction when a first record is read, and committing the transaction when a defined record, as defined in a record parameter, is encountered;
   wherein said plurality of components include a first file for reading currencies, a second file for formatting data fields, and a third file to define an event handler.

6. A computer system according to claim 5, wherein the data source is a flat file.

7. A computer system according to claim 5, wherein the plurality of components perform the further function of sending the results, by electronic mail, to a configured list of email addresses.

8. A computer system according to claim 5, wherein the function of processing the read data includes the function of formatting the read data for placement in the data destination.

9. A program storage device readable by a computer, tangibly embodying a program of instructions executable by the computer to perform method steps for mapping data from a data source to a data destination, said method steps comprising;
   establishing a plurality of separate components, operating in series between the data source and the data destination, for performing defined functions to map the data from the source to the destination, including the steps of:
   i) a first of the components reading data from the data source,
   ii) a second of the components receiving the data from the first of the components and processing the read data according to a set of rules, said second component including a formatter converting selected dates from a first format to a second format, thereby eliminating the need for writing code for formatting the selected dates, and
   iii) loading the processed data into the destination;
   wherein the first of the components operates in series between the data source and the second of the components, and the third of the components operates in series between the second of the components and the data destination;
   enabling a system administrator to update the components during use of the components;
   wherein each of the components operates independently of the other of the components and each of the components can be modified, adjusted and replaced independently of the others of the components to facilitate mapping data from a plurality of different data sources, having data in different formats, into the data destination;
   wherein the plurality of components perform the further functions of (iv) verifying the integrity of the read data, and (v) logging results into a file, and a respective one of the components performs each of the functions (i)-(v);
   wherein the data destination is a database, and said step of providing a plurality of separate components includes the further step of said plurality of components;
   mapping fixed length fields in the data source to a java object type in a pofield in the database;
   determining the start position, the length, what database column the fields map to, which database tables the fields map to, whether the fields can be updated or not, what kinds of formatting to be applied on the fields by referring to Hash Table objects which contain the mapping of pofield objects in a DBA action class that is used to manage database activity;
   calling a formatter to reformat data from the data source; and
   managing transaction by starting a transaction when a first record is read, and committing the transaction when a defined record, as define in a record parameter, is encountered; and
   wherein the second component verifies the integrity of the read data by checking for counts and data consistencies; and
   wherein said plurality of components include a first file for reading currencies, a second file for formatting data fields, and a third file to define an event handler.

10. A program storage device according to claim 9, wherein the data source is a flat file.

11. A program storage device according to claim 9, wherein the plurality of components perform the further step of sending the results, by electronic mail, to a configured list of email addresses.

12. A program storage device according to claim 9, wherein the step of processing the read data includes the step of formatting the read data for placement in the data destination.

* * * * *